June 4, 1946.　　　J. MIHALYI ET AL　　　2,401,710
RANGE FINDER
Filed March 13, 1943　　　3 Sheets-Sheet 1
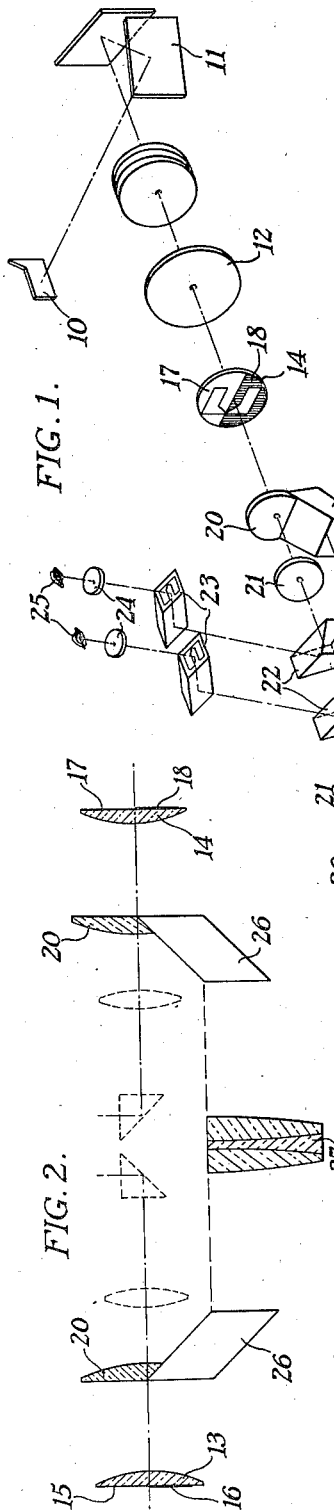
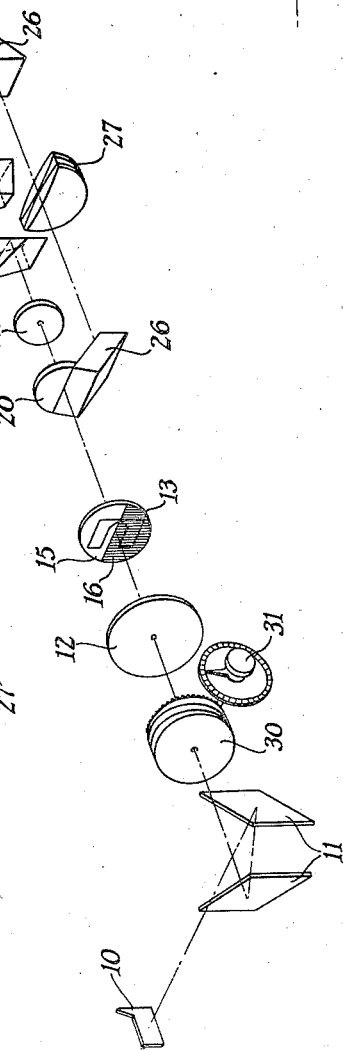
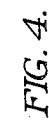
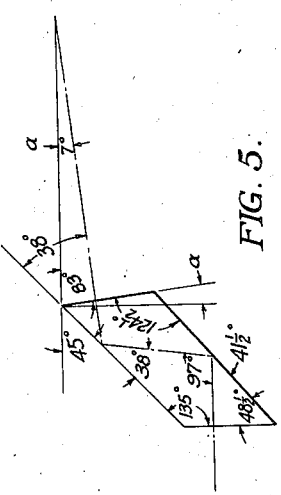
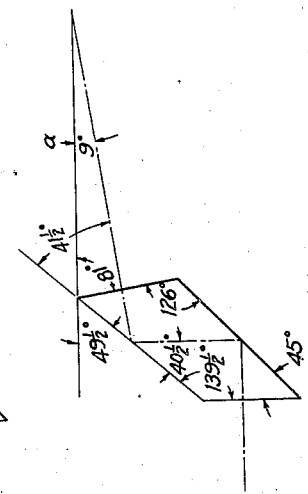
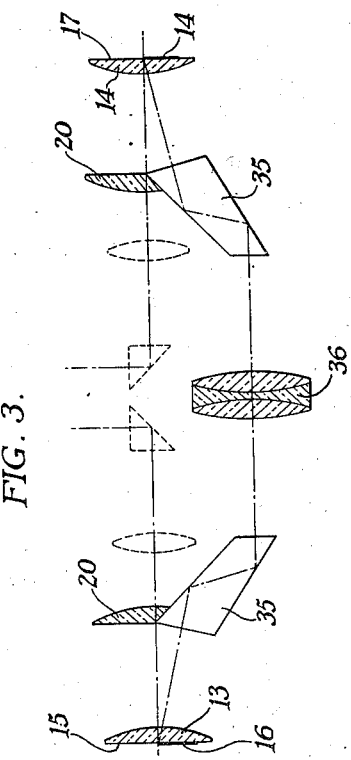
JOSEPH MIHALYI
STEPHEN M MacNEILLE
INVENTORS
BY
ATT'Y & AG'T

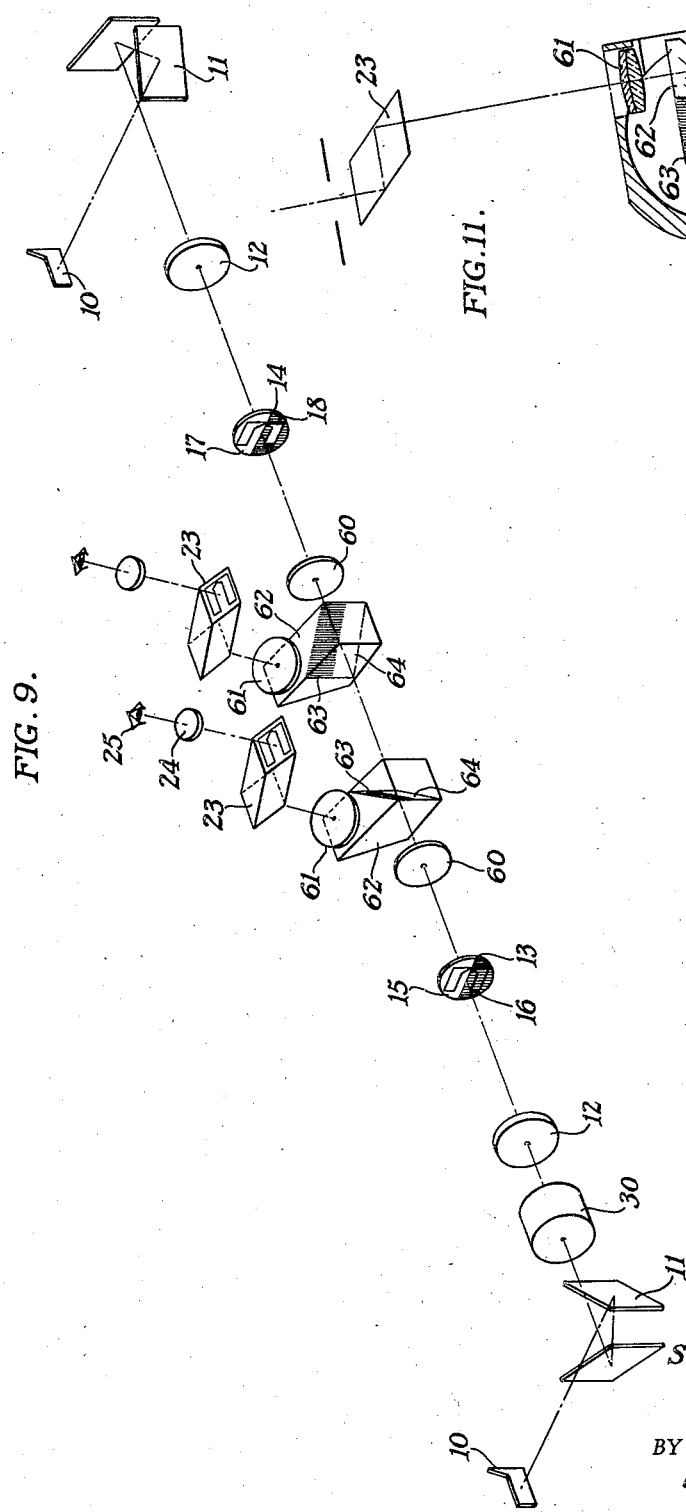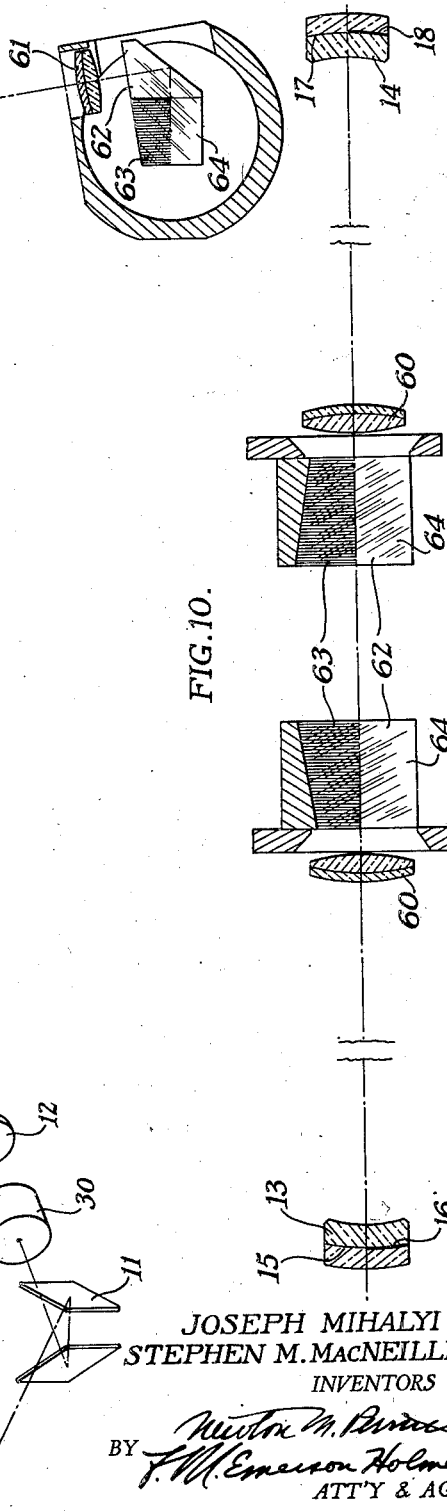

Patented June 4, 1946

2,401,710

UNITED STATES PATENT OFFICE 2,401,710

RANGE FINDER

Joseph Mihalyi and Stephen M. MacNeille, Rochester, N. Y., assignors to Eastman Kodak Company, Rochester, N. Y., a corporation of New Jersey Application March 13, 1943, Serial No. 479,101

9 Claims. (Cl. 88—2.7)

This invention relates to range finders. This is Case K of a series of applications relating to the same subject and including the following:

| Title | Serial No. | Filed | Inventors |
|---|---|---|---|
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case L | 479,102 | Mar. 13, 1943 | Mihalyi. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |
| Range finders—Case T | 508,168 | Oct. 29, 1943 | MacNeille. |

The present case is limited to ortho-pseudo-stereo range finders which are effectively coincidence range finders in which the coincidence is judged in depth. Because of the change in apparent distance of the images being compared, without appreciable change in actual image size, the images appear to change in size as well as in distance, i. e. they appear to grow as they move farther away. When the images are in coincidence they appear to be the same size and to be at the same distance. Also, either half of the instrument, that is, either the right or left eye fields, may be used for a coincidence range finder in a simplified form of the invention. Ortho-pseudo-stereo range finders permit accurate and rapid ranging and are especially useful with moving objects. Case P also relates to ortho-pseudo-stereo range finders.

The object of the present invention is to provide an ortho-pseudo-stereo range finder with all of the above discussed advantages in a simple, rugged, accurate and practical form. These advantages are gained by relaying one of the pair of stereo images to form the other pair rather than by forming the two sets of images, the ortho and pseudo sets, separately.

According to the invention a range finder has two comparison planes each with two parts, one for a direct image and one for a relayed image. If the direct images constitute an ortho stereo pair, the relayed images will constitute a pseudo stereo pair and vice versa. Any of usual forms of range finder systems may be used for forming in the direct image parts stereo images of the object being ranged and an additional optical system is included which may be considered optically between the two comparison planes, for receiving light from the direct images and for relaying it to the other part of the other comparison plane. Through the right and left eye eyepieces of the instrument, the observer then sees a pair of direct images adjacent to a pair of relayed images, one pair giving ortho stereo and the other pair giving pseudo stereo depth. The relay system includes of course at least one objective which may be made up of one or more parts. If only one or an odd number of objectives is used the relayed images are inverted relative to the direct images. Of course the system may include various reflectors and/or erecting prisms if desired. Thus, the objective system is preferably symmetrical and has the relayed image part of each comparison plane conjugate to the direct image part of the other comparison plane. The simplest form of range finder according to the invention has the left and right viewing point images formed in the left and right eye comparison planes to give an ortho stereo effect and the auxiliary objective system then forms pseudo images inverted relative to the ortho stereo images and located in the relayed image parts of the comparison planes.

A preferred embodiment of the invention has the comparison planes parallel with a horizontal dividing line between the direct and relayed image parts. The eyepieces are located between the parallel comparison planes with suitable prisms and relay lenses as required. The viewing points of the range finders are located outside the comparison planes and suitable reflectors and objectives form images in the direct image parts of the comparison planes. A symmetrical objective system is located between the comparison planes and adjacent to the viewing system with the relayed image part of each plane conjugate to the direct image part of the other plane. To increase the optical efficiency of the viewing and relaying systems, both of which are between the comparison planes requires relatively large elements which thus conflict with one another. To overcome this difficulty, a preferred embodiment of the invention includes in one or other of the two adjacent systems, a pair of substantially rhomboid prisms for laterally spacing the two systems. In one example of the invention, such a pair of prisms is included in the relay objective system and the viewing system may or may not also be such a pair of prisms, Another preferred embodiment uses erector lenses between each comparison plane and the corresponding eyepiece which lenses consists of two components and uses an erecting prism between the two components with a half silvered surface in the prism. Through the unsilvered halves of each prism light passes from the direct image part of each plane to the relayed image part of the other plane, the relay lens being made up of the front component of each of the erector lenses.

The invention and its advantages will be fully understood from the following description when read in connection with the accompanying drawings, in which:

Fig. 1 is a perspective view of an optical system incorporating the present invention;

Fig. 2 is a vertical section of one detail of Fig. 1;

Fig. 3 shows an alternative arrangement of the detail shown in Fig. 2;

Figs. 4 and 5 illustrate two forms of the prisms used in Fig. 3;

Fig. 9 is a perspective view of a preferred embodiment of the invention;

Figs. 10 and 11 are enlarged front and side elevations of details of Fig. 9.

Figure 6:
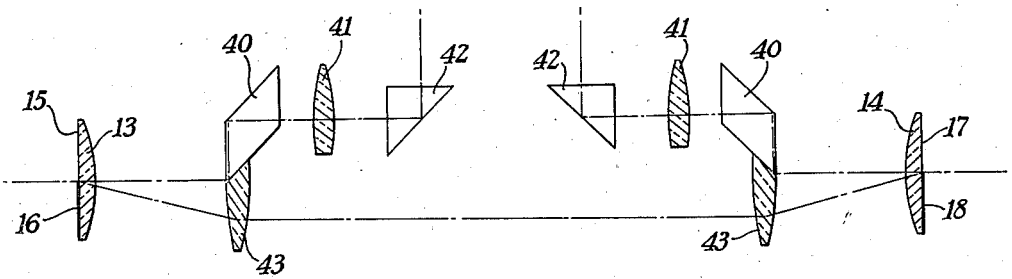
Figs. 6, 7 and 8 illustrate the relaying and viewing systems of alternative embodiments of the invention.

In Figs. 1 and 2 the object being ranged is represented by small unsymmetrical blocks 10 located close to the viewing points of the instrument. Actually only a single object at a great distance from the instrument is being ranged. Light from this object is received by reflectors 11 constituting optical squares and reflected through objectives 12 to form stereo images in comparison planes at field lenses 13 and 14. The left viewing point image is formed in a transparent area 15 and the right viewing point image is similarly formed in a transparent area 17 of the comparison planes 13 and 14 respectively. Through relay lenses 20 and 21, prisms 22, rhombs 23 and eyepieces 24 these direct images may be viewed by the right and left eyes 25 of an observer. The rhombs 23 are adjustable for different interocular separations. These images give ortho stereo effects in the usual way and if fixed reticle marks were included in the comparison planes, the instrument could be used as an ordinary stereo range finder. The apparent object distance is varied by moving the image in the comparison plane 13 by adjusting a light deviating means 30 by means of a knob 31, the range being given by a scale also operated by this knob 31.

According to the invention, a pair of rhomboid prisms 26 and an objective 27 are positioned between the comparison planes with the planes conjugate to each other. That is, the transparent area 15 of comparison plane 13 is conjugate to a reflecting area 18 of comparison plane 14. Similarly a reflecting area 16 is conjugate to the transparent area 17. The transparent areas may be diffusing but preferably the comparison planes include field lenses 13 and 14 as shown best in Fig. 2. Thus inverted on the reflecting area 18 there appears a left viewing point image similar to the one of the transparent area 15. These images on the reflecting areas 16 and 18 are also viewed through the viewing system including elements 20 to 24 and constitute a pseudo stereo pair. Due to the erector lenses 20 and 21 the images seen in the eyepieces 24 are all inverted relative to those in the comparison planes, and hence, through the eyepieces 24, the upper half of the field includes a pseudo stereo pair of images and the lower half includes a pair of ortho stereo images.

It will be noted particularly in Fig. 2 that only half of the objective 27 is used or required when the prisms 26 are perfectly rhomboid. In Fig. 3, however, slightly distorted rhomboid prisms 35 are used together with a whole objective 36. The prisms 35 as shown in Figs. 4 and 5 have their sides off-parallel by an amount which depends on the angle between the optic axis of the objective 36 reflected to reach the dividing line of the comparison planes and the optic axis of the comparison planes. If this angle is called $\alpha$ as shown in Figs. 4 and 5, the entrance and exit faces of the substantially rhomboid prisms should be at an angle $\alpha$ to each other and the two reflecting faces should be at an angle $$\frac{\alpha}{2}$$

to each other. The angle between the reflecting faces and the entrance and exit faces is not critical but for convenience may have either of the values shown in Figs. 4 and 5. The arrangement shown in Fig. 3 is somewhat more efficient than that in Fig. 2, gives accurately focused images and easily ranged images. It has the disadvantage that the relayed images have slight keystone distortion which, however, is negligible at the dividing line of each comparison plane.

In the arrangement shown in Fig. 6 rhombs 40 are introduced in the viewing system rather than in the relay system which in this case consists of a single objective made of two spaced lenses 43. The viewing system has erector lenses 41 and prisms 42 in each half.

Figure 7:
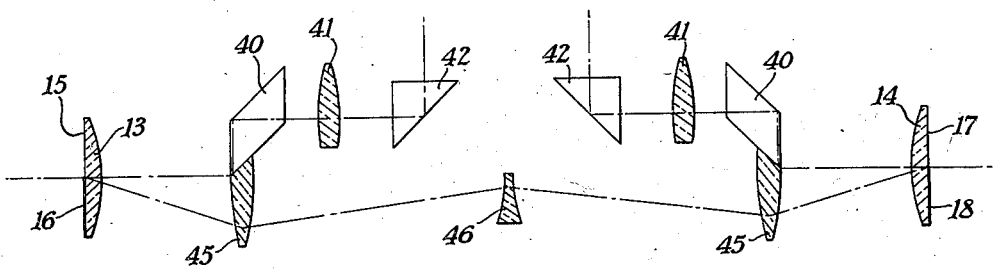

Since it is not easy to correct an objective made of two "eyepiece type" lenses such as 43, the arrangement shown in Fig. 7 is preferable wherein the relay system is made up as a triplet consisting of two positive lenses 45 symmetrically located about a negative lens 46. Any form of relay objective may be used.

Figure 8:
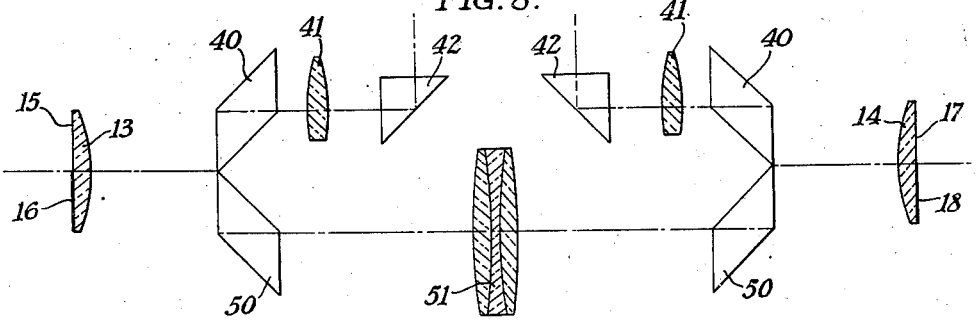

In Fig. 8 both systems include rhombs. This figure differs from Figs. 6 and 7 by the inclusion of rhombs 50 and an objective 51 to form the relay system.

The system shown in Figs. 9, 10 and 11 differs from that shown in Fig. 1, mainly by the form of relay lens used. In each viewing system the erector lens is made up of two components 60 and 61 with an erector prism 62 between them. The images in the comparison planes are refocused by these erector lenses in the focal planes of the eyepieces 24. In each erector prism 62, the first reflecting surface has the upper half 63 silvered to reflect the light to the second reflecting surface and thence to the eyepieces and the lower half transparent, through which lower half the direct images in parts 15 and 17 may be relayed to the reflecting parts 18 and 16 of the comparison planes. The relay lens is made up of the two front components 60 of the erector lens systems. In the specific arrangement shown the erector lenses are symmetrical, i. e., the lenses 60 and 61 are identical and thus the light beams between the lenses is collimated and hence in this arrangement no additional lenses such as lens 46 of Fig. 7 are needed.

It is desirable to have this complete arrangement in which the images are erected and separate eyepieces are used but a simplified form of this instrument has the eyes looking directly into the mirrors 63 so that the lenses 60 act as eyepieces. Of course semi-transparent mirrors may be used in place of mirrors 63 and covering any desired portion of the collimated beams.

Having thus described the preferred embodiments of our invention, we wish to point out that it is not limited to these structures but is of the scope of the appended claims.

What we claim and desire to secure by Letters Patent of the United States is:

1. An ortho-pseudo-stereo range finder comprising two comparison planes each with two parts, one for a direct image and one for a relayed image, means for viewing the planes respectively with the right and left eyes, means for forming in the direct image parts stereo images of the object being ranged and an optical system including at least one objective for receiving light from the direct image in each comparison plane and focusing it in the relayed image part of the other comparison plane.

2. An ortho-pseudo-stereo range finder comprising two comparison planes each with two parts, one for a direct image and one for a relayed image, means for viewing the planes respectively with the right and left eyes, means for receiving at two spaced viewing points light from the object being ranged and for forming stereo images in the direct image parts of the comparison planes, and a symmetrical objective system optically between the comparison planes with the relayed image part of each comparison plane conjugate to the direct image part of the other plane, whereby both left and right viewing point images are formed in each comparison plane.

3. A range finder according to claim 2 in which the direct image forming means forms left and right viewing point ortho stereo images respectively in the left and right eye comparison planes and said symmetrical objective system includes only one objective and forms pseudo stereo images inverted relative to the ortho stereo images.

4. An ortho-pseudo-stereo range finder comprising two parallel comparison planes each with a horizontal dividing line between two parts one for a direct image and one for a relayed image, means between the planes for viewing them respectively with the right and left eyes, means for receiving light from the object being ranged at two viewing points spaced outside the comparison planes and for forming stereo images in the direct image parts and a symmetrical objective system also between the planes adjacent to the viewing system with the relayed image part of each plane conjugate to the direct image part of the other plane whereby both left and right viewing point images are formed in each comparison plane.

5. A range finder according to claim 4 in which the viewing means system and the objective system include at least one pair of substantially rhomboid prisms for laterally spacing the two systems.

6. A range finder according to claim 4 in which the objective system includes a pair of substantially rhomboid prisms for laterally spacing it from the viewing means and includes an objective between the two rhomboid prisms.

7. A range finder according to claim 4 in which the viewing means includes erector lenses each with a front and a rear half with a reflecting surface between the halves and in which said symmetrical objective system includes the front halves of the two erector lenses.

8. An ortho-pseudo-stereo range finder comprising two parallel comparison planes each with a direct image part and a relayed image part, means for forming in the direct image parts with light from different viewing points, images of the object being ranged and between the two planes a combination viewing and relaying system including reflectors respectively for receiving light from the comparison planes and directing it to left and right eye eyepieces and a positive lens between each comparison plane and the corresponding reflector and at its focal length from the comparison plane for collimating the light to the reflectors, the lenses being effectively wider than the reflectors for also sending light to each other for relaying the direct images of each comparison plane to the relayed image part of the other plane.

9. An ortho-pseudo-stereo range finder comprising two parallel comparison planes each with a transparent direct image part and a reflecting relayed image part, means for receiving at spaced viewing points light from the object being ranged and for forming images thereof in the direct image parts, a relay objective including two similar positive components between the planes for relaying the direct images to the relayed images parts of the other plane respectively and two reflecting means between the positive components for reflecting to one side for stereo viewing part of the light beams coming from the components.

JOSEPH MIHALYI.
STEPHEN M. MacNEILLE.